(12) United States Patent  
Li (10) Patent No.: US 9,667,544 B2  
(45) Date of Patent: *May 30, 2017

(54) SECURITY DEVICE IMPLEMENTING FLOW LOOKUP SCHEME FOR IMPROVED PERFORMANCE

(71) Applicant: Palo Alto Networks, Inc., Santa Clara, CA (US)

(72) Inventor: Sidong Li, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 14/477,654

(22) Filed: Sep. 4, 2014

(65) Prior Publication Data

US 2016/0149812 A1     May 26, 2016

Related U.S. Application Data

(63) Continuation of application No. 13/750,912, filed on Jan. 25, 2013, now Pat. No. 8,854,972.

(51) Int. Cl.
| | |
|---|---|
| *H04L 12/28* | (2006.01) |
| *H04L 12/743* | (2013.01) |
| *H04L 12/801* | (2013.01) |
| *H04L 12/851* | (2013.01) |
| *H04L 29/06* | (2006.01) |
| *H04L 12/721* | (2013.01) |

(52) U.S. Cl.
CPC .......... *H04L 45/7453* (2013.01); *H04L 45/38* (2013.01); *H04L 47/12* (2013.01); *H04L 47/2441* (2013.01); *H04L 63/02* (2013.01)

(58) Field of Classification Search
None
See application file for complete search history.

(56) References Cited

U.S. PATENT DOCUMENTS

| | | | | |
|---|---|---|---|---|
| 5,692,177 | A * | 11/1997 | Miller | ............... G06F 17/30949 |
| 2006/0179071 | A1* | 8/2006 | Panigrahy | ......... G06F 17/30949 |
| 2006/0265370 | A1* | 11/2006 | Qian | ................. G06F 17/30949 |
| 2014/0153571 | A1* | 6/2014 | Neugebauer | ........ H04L 45/7457 370/392 |

* cited by examiner

*Primary Examiner* — Kibrom T Hailu  
(74) *Attorney, Agent, or Firm* — Van Pelt, Yi & James LLP (57) ABSTRACT

A security device performing flow classification and storing flow information in a flow table includes a flow engine generating a flow key identifying a flow to which a received data packet belongs, the flow engine applying a hash function to the flow key to generate a flow hash value and an entry hash value being orthogonal to each other. The security device includes a hash map and a flow data table. The hash map table is indexed by the flow hash value and an entry index value is derived from the entry hash value. The flow data table is indexed by the flow hash value and the entry index value to return at least a retrieved flow key from a flow record of an indexed entry.

21 Claims, 8 Drawing Sheets

SECURITY DEVICE IMPLEMENTING FLOW LOOKUP SCHEME FOR IMPROVED PERFORMANCE

CROSS REFERENCE TO OTHER APPLICATIONS

This application is a continuation of U.S. patent application Ser. No. 13/750,912, entitled SECURITY DEVICE IMPLEMENTING FLOW LOOKUP SCHEME FOR IMPROVED PERFORMANCE filed Jan. 25, 2013, now U.S. Pat. No. 8,854,972, issued Oct. 7, 2014, which is incorporated herein by reference for all purposes.

BACKGROUND OF THE INVENTION

Devices such as firewalls are sometimes used to prevent users from accessing resources to which they are not authorized. As an example, members of the public may be entitled to access content served by a web server, but not authorized to access other services available on the server such as administrative tools. In another example, employees of a company may be entitled to access certain websites or certain class of websites while other websites or other classes of websites may be prohibited for all employees. Firewalls and other security devices typically enforce policies against network transmissions based on a set of rules.

To implement effective security policy enforcement, a firewall needs to be capable of processing incoming data packets at the packet data rate of the protected network so that network traffic can be effectively examined as the traffic is being communicated. Furthermore, as firewalls or security devices are deployed in enterprise or data center applications, the firewalls often need to be scaled up to handle increased network traffic.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
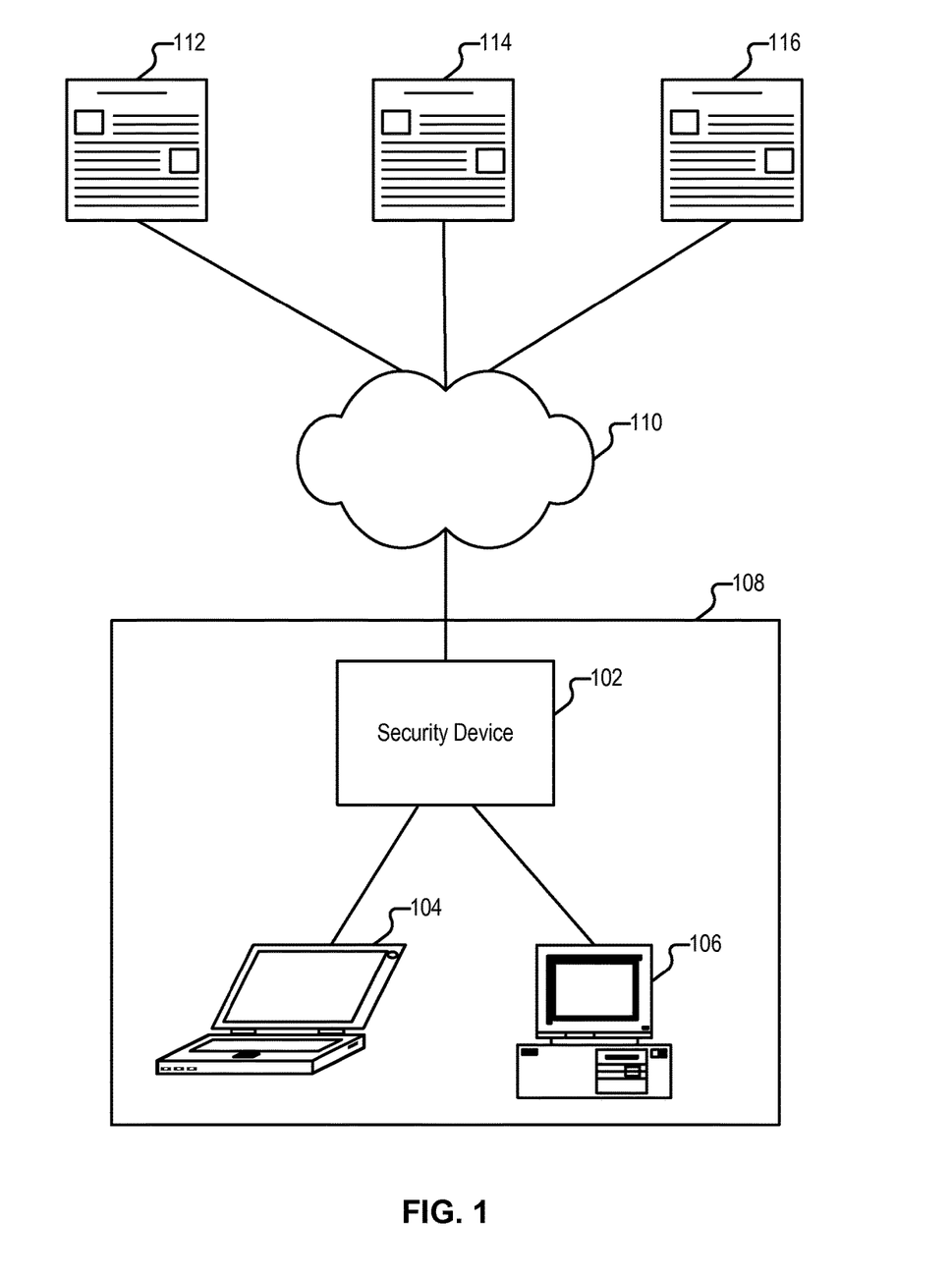
FIG. 1 illustrates an embodiment of an environment in which security policies are enforced.

FIG. 1 illustrates an embodiment of an environment in which security policies are enforced. In the example shown, clients 104 and 106 are a laptop computer and desktop computer, respectively, present in an enterprise network 108. Security device 102 (also referred to herein as "device 102") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or other consumption constraint. Other types of policies can also be enforced, such as ones governing traffic shaping, quality of service, or routing with respect to URL information. In some embodiments, security device 102 is also configured to enforce policies with respect to traffic that stays within enterprise network 108. In yet other embodiments, security device 102 is configured to enforce policies with respect to traffic from outside of enterprise network 108 attempting to gain access to the enterprise network. For example, security device 102 may be configured to detect activities associated with hacker attacks into the network.

In some embodiments, the security device 102 includes a security appliance, a security gateway, a security server, a firewall, and/or some other security device, which, for example, can be implemented using computing hardware, software, or various combinations thereof. The functionality provided by security device 102 can be implemented in a variety of ways. Specifically, security device 102 can be a dedicated device or set of devices. The functionality provided by device 102 can also be integrated into or executed as software on a general purpose computer, a computer server, a gateway, and/or a network/routing device. Further, whenever device 102 is described as performing a task, a single component, a subset of components, or all components of device 102 may cooperate to perform the task.

Similarly, whenever a component of device 102 is described as performing a task, a subcomponent may perform the task and/or the component may perform the task in conjunction with other components. In various embodiments, portions of device 102 are provided by one or more third parties. Depending on factors such as the amount of computing resources available to device 102, various logical components and/or features of device 102 may be omitted and the techniques described herein adapted accordingly. Similarly, additional logical components/features can be added to system 102 as applicable.

Figure 2:
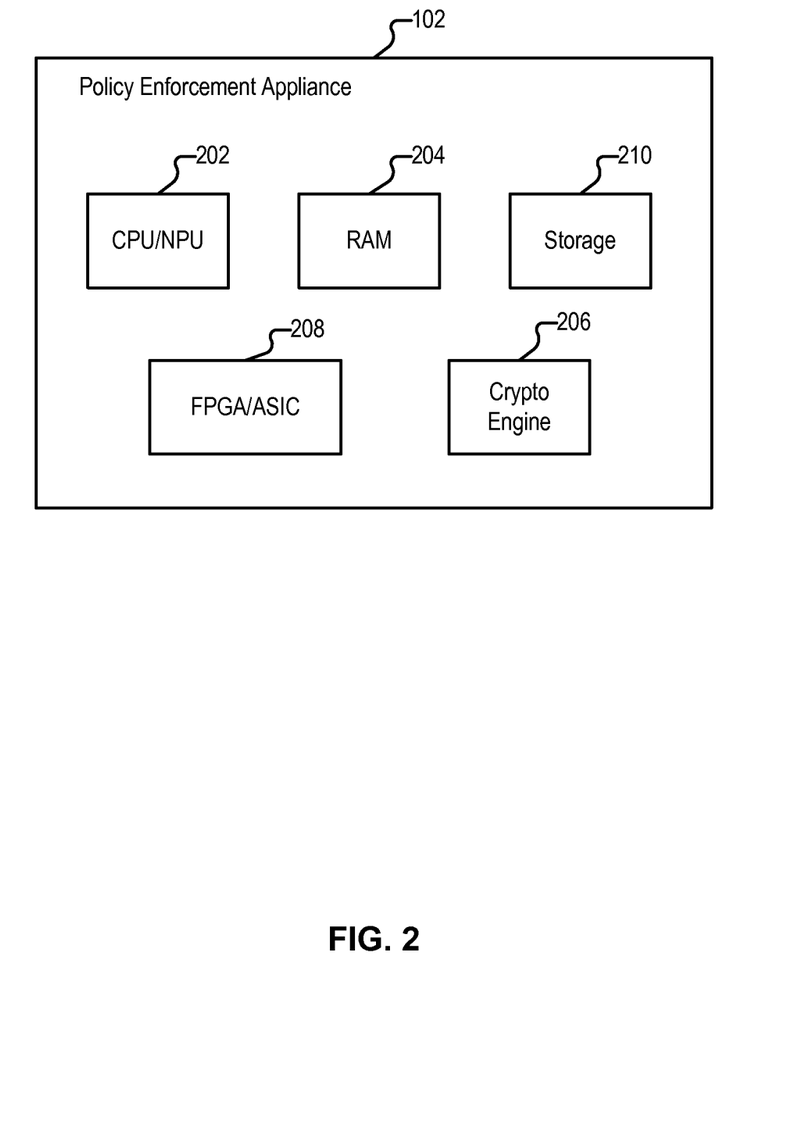
FIG. 2 illustrates an embodiment of a security device.

FIG. 2 illustrates an embodiment of a security device. The example shown is a representation of physical components that are included in device 102, in some embodiments. Specifically, device 102 includes a high performance multi-core CPU 202 and a memory 204. CPU 202 is sometimes referred to as a network processor or a NPU (network processing unit) as a processor being specifically configured for network applications. Device 102 also includes a storage 210 (such as one or more hard disks), which is used to store policy and other configuration information. Security device 102 can also include one or more optional hardware accelerators. For example, device 102 can include a cryptographic engine 206 configured to perform encryption and decryption operations, and one or more FPGAs or ASICs 208 configured to perform signature matching, act as network processors, and/or perform other tasks.

To implement complex security policies, security device 102 processes incoming data packets to determine if one or more security policy should be applied. To that end, security device 102 includes a forwarding engine which is largely implemented in an FPGA or an ASIC 208. The forwarding engine encompasses a flow engine for performing traffic classification and flow lookup. A flow table may be stored in memory 204 containing flow records associated with incoming data packets. The flow table facilities packet processing to ensure that network traffic is examined effectively as the traffic is being communicated.

Figure 3:
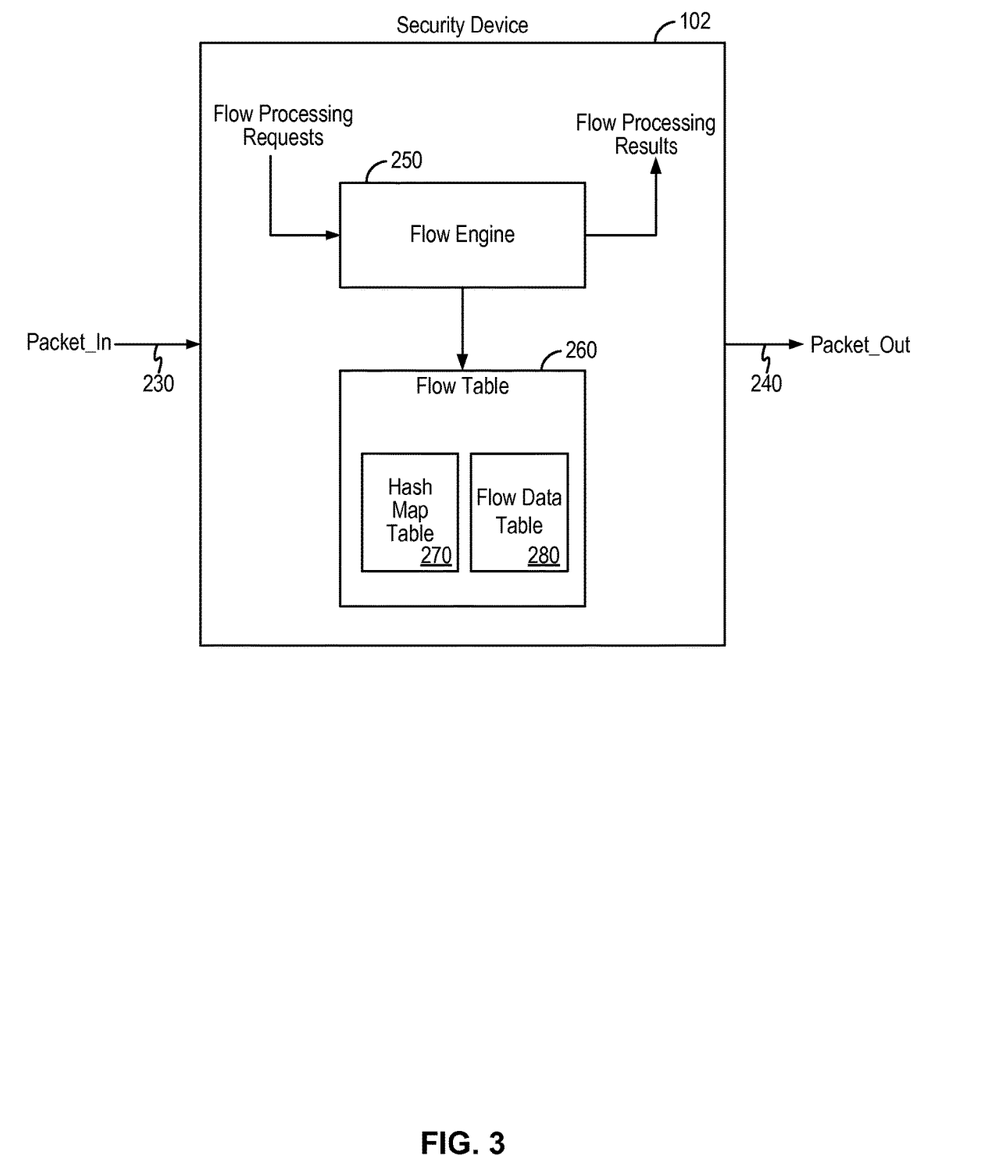
FIG. 3 illustrates an embodiment of a security device including a flow engine and a flow table.

FIG. 3 illustrates an embodiment of a security device including a flow engine and a flow table. The security device implements a flow lookup scheme in embodiments of the present invention to realize increased flow lookup performance. In particular, the flow lookup scheme enables the flow engine to increase the flow capacity it can handle while reducing cost of implementation. The flow lookup scheme also results in improved collision handling. In the example shown, the functionality of security device 102 is implemented in a firewall. Referring to FIG. 3, security device 102 receives incoming data packets (Packet_In) on an input port 230 and forwards outgoing data packets (Packet_Out) on an output port 240 after processing the data packets for security enforcement. Security device 102 performs flow classification on each received data packet and stores flow information in a flow table so as to apply the appropriate security policy. Security device 102 includes a flow engine 250 communicating with a flow table 260. Flow engine 250 performs memory access and flow data look-up and provides the results to downstream processors. In this manner, flow engine 250 offloads processing intensive tasks from downstream network processors. Flow engine 250 also operates to normalize the data packet format and encode the necessary information for processing the data packet in the header in a standard format. In this manner, subsequent processing of the data packet can make use of information in the standard packet header, without needing to take into account different Internet protocols. Security device 102 may include other components not shown in FIG. 3 to implement other functionalities of the security device, such as maintaining event statistics and policy enforcement. The example shown in FIG. 3 illustrates primarily components of security device 102 associated with the flow lookup operations.

Flow engine 250 receives incoming data packets which can be communication from client devices (such as computers 104, 106) or from the external network (such as network 110). Flow engine 250 processes the received data packets to identify the flow associated with the received data packets. In the present description, a flow refers to a TCP/IP flow which includes a sequence of data packets communicating information between a source and a destination in one direction. In the present description, TCP/IP refers to the Internet protocol suite including the set of communications protocols used for the Internet and data networks. The Internet protocol suite includes IP (Internet Protocol), TCP (Transmission Control Protocol), UDP (User Datagram Protocol) or other protocols. A flow identifier (or "Flow ID") for a data packet is determined from information in the header of the data packet. In some embodiment, the flow identifier for a data packet is determined from information in the header of the data packet as well as associated environmental information, such as the incoming physical port of the security device receiving the data packet. The flow identifier is a unique value used to identify a flow in the security device 102. In some embodiments, the flow identifier is determined from the 5-tuple information of the data packet, including the source IP address, destination IP address, the source port number, the destination port number and the protocol in use. In another embodiment, the flow identifier is determined from the 6 or more tuple information of the data packet which, in addition to the 5-tuple information, includes the interface being used or the incoming physical port.

Flow engine 250 performs flow lookups in response to flow processing requests from other processing modules (not shown) of security device 102. After the flow engine completes the flow processing requests, flow engine 250 provides flow processing results to the requesting modules. Based on flow attributes stored in the flow records associated with one or more flows, security device 102 may perform network security functions and applies network security policies to the received data packets. Security device 102 may include modules, such as a forwarding engine (not shown), for forwarding the received data packets onward after processing for security functions.

Security device 102 maintains the flow table 260 for storing flow records associated with each flow identified from the received data packets. A flow record refers to an entry in the flow table consisting of a flow identifier and its associated flow data, often referred to as "flow attribute." Flow attributes may contain one or more rules which can be used by modules of the security device 102 to further process the received data packets associated with a given flow. For example, the flow attributes may contain policy information (firewall policy or intrusion prevention system (IPS) policy) to apply to the flow or the received data packets. As a further example, the flow attributes may contain information required by a session engine to decide whether a particular data packet should be allowed. In another example, the flow attributes may contain rules to implement network policies regarding, for example, connection time out, time billing, and bandwidth usage. The flow attributes may further contain other information that is used by other modules of the security device, such as encryption parameters, address translation parameters, bookkeeping and statistics information.

Flow table 260 maintains a mapping of all active flows in the security device 102. For each received data packet, the flow engine 250 performs flow lookups on behalf of other processing modules in the security device 102. In general, flow engine 250 determines, among other things, whether a received data packet belongs to a known flow or to an unknown flow. The flow identifier of the received data packet is used to locate a flow record in the flow table 260 if the data packet belongs to a known flow. When no flow record is found, the flow engine 250 reports that the flow is unknown.

Flow table 260 may be implemented using one or more memory devices. In conventional systems, the flow table may be implemented using TCAM with content matching or using DRAMs with brute force comparison to find a matching flow record. However, such conventional techniques become impractical when the number of flows becomes large and the flow identifier includes large number of data bits. Hashing has been applied in flow lookup tables. However, traditional hashing techniques applied in flow tables often yield undesirable false positive results.

In embodiments of the present invention, the flow table 260 is configured to handle large flow capacity and increased packet rate to support increased volume and data rate of network traffic. Furthermore, the flow table is configured to facilitate a flow lookup method that ensures low latency and improved collision handling. For instance, the security device 102 may need to support up to 64 million flows at a data packet rate of 150 Mpps (millions packet per second). In embodiments of the present invention, flow table 260 is implemented using two separate hash tables: a hash map table 270 and a flow data table 280. Both tables are configured to include the same number of hash buckets and the same number of entries per bucket. However, the width of the entries in the two tables is different. As will be explained in more detail below, the hash map table 270 stores a collection of entry hash values which are used to derive an entry index used to index entries in the buckets of the flow data table 280. The flow data table 280 stores the flow records associated with one or more flows and is indexed by a flow hash value and an entry index. As thus constructed, the hash map table is much smaller in size than the flow data table so that implementation of the flow lookup method does not result in significant cost increase.

Figure 4:
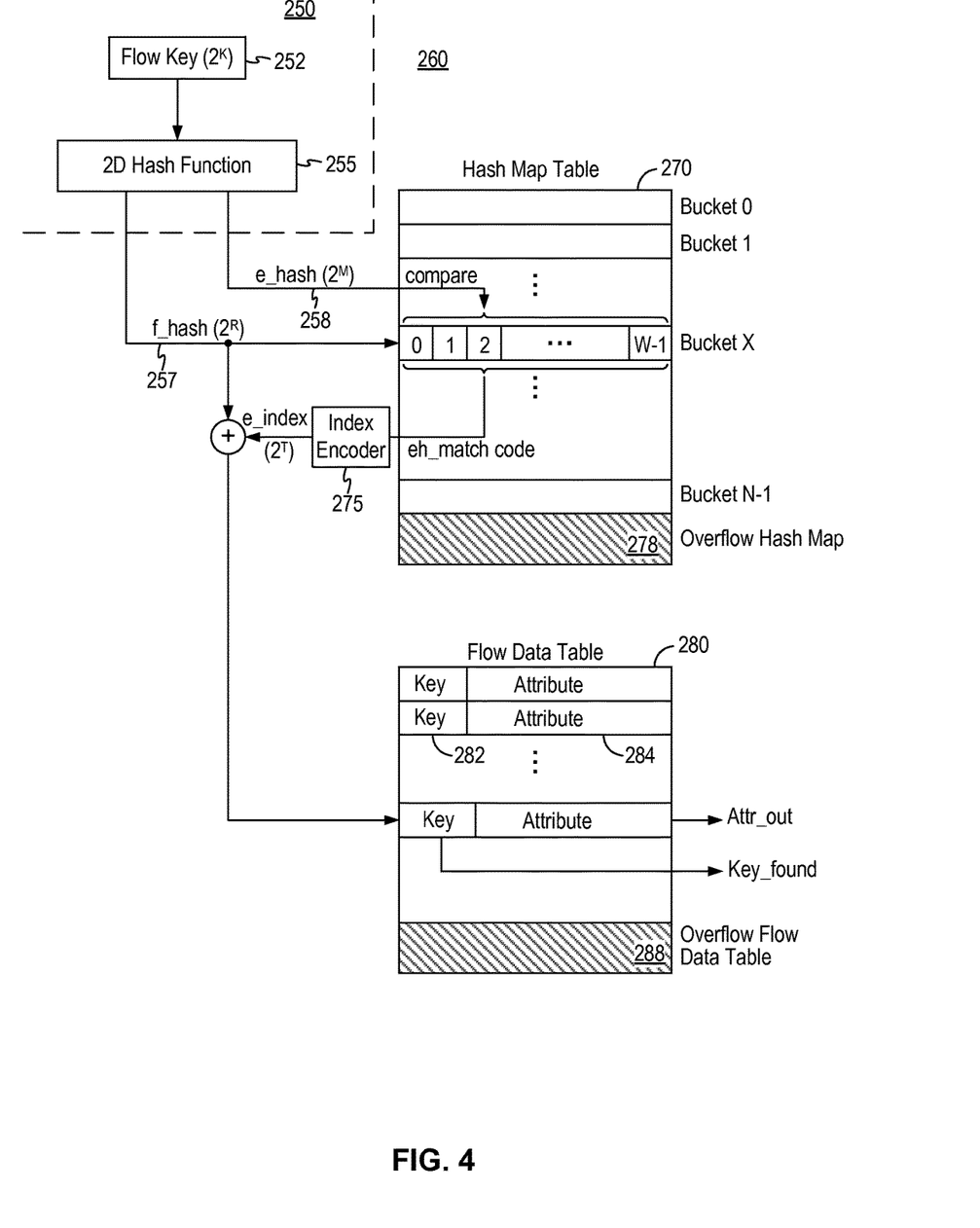
FIG. 4 illustrates details of a flow table in a security device and a flow lookup method applied to the flow table in embodiments of the present invention.

FIG. 4 illustrates details of a flow table in a security device and a flow lookup method applied to the flow table in embodiments of the present invention. Referring to FIG. 4, as data packets are received by the security device, the flow engine 250 generates a flow identifier for each received data packet. As described above, the flow identifier uniquely identifies each flow being processed or handled in security device 102. In embodiments of the present invention, the flow table 260 is implemented using hash tables and the flow identifier is therefore referred to as a "flow key." The flow key is generated from the 5-tuple or 6-tuple (or more) information of the received data packets to uniquely associate received data packets belonging to the same flow. As such, a flow key typically consists of a large number of data bits. For example, under the IPv4 Internet Protocol, the flow key can be a 120-bit data field; while under the IPv6 Internet Protocol, the flow key can be a 320-bit data field. Because of the large address space of the flow key, the flow engine 250 of the security device 102 uses a hash function to remap the large address space of the flow key to an address space that is smaller and also more evenly distributed.

When hashing is used, collision is unavoidable. That is, even when the hash function remaps the flow key to a randomly generated address space and the address space is evenly distributed over all hash values, there is still the possibility of collision where multiple IP addresses may map to the same hash value. In embodiments of the present invention, the flow engine and the flow table implement a flow lookup method that improves collision handling. In some embodiments, the flow engine 250 implements a two-dimensional (2D) hash function to improve collision handling so that collision of the flow keys becomes merely a probability problem. Referring to FIG. 4, the flow engine 250 receives a flow key 252 in K bits. The address space covered by the flow key is $2^K$. The flow engine applies a 2D hash function 255 to generate two orthogonal hash values. More specifically, the 2D hash function 255 generates a flow hash (f_hash) value 257 in R bits ($2^R$ address space) and an entry hash (e_hash) value 258 in M bits ($2^M$ address space) where both hash values are used to index the flow table 260.

For example, when the flow key includes 120 bits, the address space covered by the flow key is $2^{120}$. However, the address space is usually only sparsely populated. That is, the 64 million flows may occupy only a small part of the $2^{120}$ address space. For instance, the actual address space used by the 64 million flows may be only $2^{26}$, requiring only 26 bits of address values. In embodiments of the present invention, the flow engine 250 applies a hash function to map the 120-bit flow key to two smaller, fixed length hash values. Although a $2^{26}$ address space is sufficient, a slightly larger address space, such as $2^{32}$, is used to reduce the probability of collision. In one embodiment, the flow hash (f_hash) value is a 32-bit value with an address space of $2^{32}$. However, with the flow engine generating hash values for 64 million flows, collision will occur in certain cases where two flow keys associated with two different flows map to the same flow hash value. In embodiments of the present invention, the flow engine manages collision through the use of the secondary, orthogonal hash as the entry hash (e_hash) value in M bits. As thus configured, the flow hash 257 is used to index a bucket in the hash map table 270 and the entry hash 258 is used to index an entry in the indexed bucket, as will be explained in more detail below.

In embodiments of the present invention, the 2D hash function 255 can be implemented as two separate orthogonal hash functions generating independent flow hash values and entry hash values. In other embodiments, the 2D hash function 255 can be an one-dimensional (1D) hash function generating a long hash value. A first portion of the hash value is used as the flow hash value while a second portion of the hash value is used as the entry hash value. The use of the term "2D hash function" in the present description refers to generation of two hash values—the flow hash and the entry hash. The two hash values can be derived from a single hash function or two separate hash functions.

As described above, flow table 260 includes two hash tables: the hash map table 270 and the flow data table 280. Both the hash map table 270 and the flow data table 280 are configured to include N buckets and each bucket has a bucket depth of W entries. Thus, the capacity of each hash table is N*W. In some examples, the hash tables have a capacity of at least N=4 million buckets and the bucket depth W is 16 entries or 32 entries. The hash tables may include overflow areas allocated to store overflow entry hash values (area 278) and overflow flow data (area 288). Although, the hash map table 270 and the flow data table 280 are configured to have the same number of buckets and the same number of entries per bucket, the two hash tables are not of the same size as the width of the entries is different in the two hash tables. The hash map table 270 stores an entry hash value in each entry of the N buckets. When the entry hash value is represented in M bits, each bucket entry stores an M-bit value and a bucket in the hash map table 270 is thus M×W bits wide. In some embodiments, the entry hash may have M=8 bits for 16 entries and the entry hash may have M=12 bits for 32 entries. Thus, the hash map table 270 is a small memory. On the other hand, the flow data table contains N bucket of W entries each where each entry contains the flow key (e.g. K=120 bits) and the associated flow attribute (e.g. 64 bytes). Thus, the flow data table 280 has a much wider width and is a much larger memory.

As thus configured, the flow hash f_is used to index one of N buckets in the hash map table 270 while the entry hash e_hash is used to filter the stored entry hash values in the W entries of the indexed bucket to find a match. More specifically, the entry hash e_hash is compared against the W stored entry hash values in the indexed bucket. The comparison generates an entry hash match code (eh_match code) in W bits, where a bit in the code is set to indicate a matching entry hash value in a specific entry. The comparison of the e_hash value 258 may generate no matches in a bucket, or the comparison may generate one or more matches in the bucket. To that end, the entry hash match code indicates whether one or more matches are found in the entries of the indexed bucket.

For instance, for a bucket with 5 entries (W=5), the entry hash match code may be "01001" indicating that the second entry and the fifth entry in the bucket contain matching entry hash values. In flow table 260, an index encoder 275 receives the entry hash match code in W bits and generates an entry index value e_index in T bits for each entry containing a matching entry hash value. In other words, the index encoder 275 generates an entry index value for each bit that is set in the entry hash match code. In the above example, the index encoder 275 would generate "010" and "101" for the second and fifth bits that are set in the entry hash match code. When the entry index value e_index is in T bits, the number of entries per bucket is given as $W \leq 2^T$.

The flow hash f_and an entry index e_index are then used to index the flow data table 280. When multiple entry index values are generated, each e_index is applied in turn. The combination of the flow hash and the entry index identifies the bucket and the entry in the bucket in which the desired flow record resides. Each entry of the flow record contains a flow key 282 and the associated flow attribute 284. To verify the correct flow has been found, the flow key 282 retrieved from the flow data table 280 is to be matched to the flow key 252 generated by the flow engine 250 to be considered a hit. When the retrieved flow key 282 matches the generated flow key 252, the flow data table may assert a Key_Found signal and the flow attribute 284 of the indexed entry is provided as output. When the retrieved flow key 282 does not match the generated flow key 252, another lookup in the flow data table 280 will be performed using the next e_index, if any, until all the e_index has been used up. If a matching flow key is not found with any of the e_index, then the flow data table may assert a Key_Not_Found signal (not shown).

The use of the 2D hash function 255 and the hash map table 270 enables improved collision handling in the flow lookup operation of the security device 102 so that flow lookup collision becomes a probability problem only. The two orthogonal hashes operate as coarse and fine indices to accurately, precisely and quickly locate a flow record in the flow data table 280. More specifically, the flow hash f_is used to identify a bucket in which the flow record may reside and the entry hash e_hash, acting as a secondary hash, is used to pinpoint the location of the entry in that bucket belonging to the flow record. The entry index is used as an entry offset to locate the desired flow record from the indexed bucket in the flow data table. With the use of the two orthogonal hashes, the flow lookup method can locate the correct flow record 99.99% of the time. In the few cases where the flow lookup method results in collision, the flow engine may iterate the flow lookup method a few times to fetch the correct flow record. Furthermore, because the hash map table is a small memory, reading and comparison of the entry hash values can be performed very quickly to obtain one or more entry index values. Thus, the flow lookup method can achieve a high lookup rate while the flow data table maintains a large flow capacity.

In some embodiments, when the flow lookup method results in Flow Not Found, the method may proceed to go to the overflow areas 278 and 288 and applies the same lookup scheme to determine if a matching flow record is stored in the overflow areas.

Figure 5:
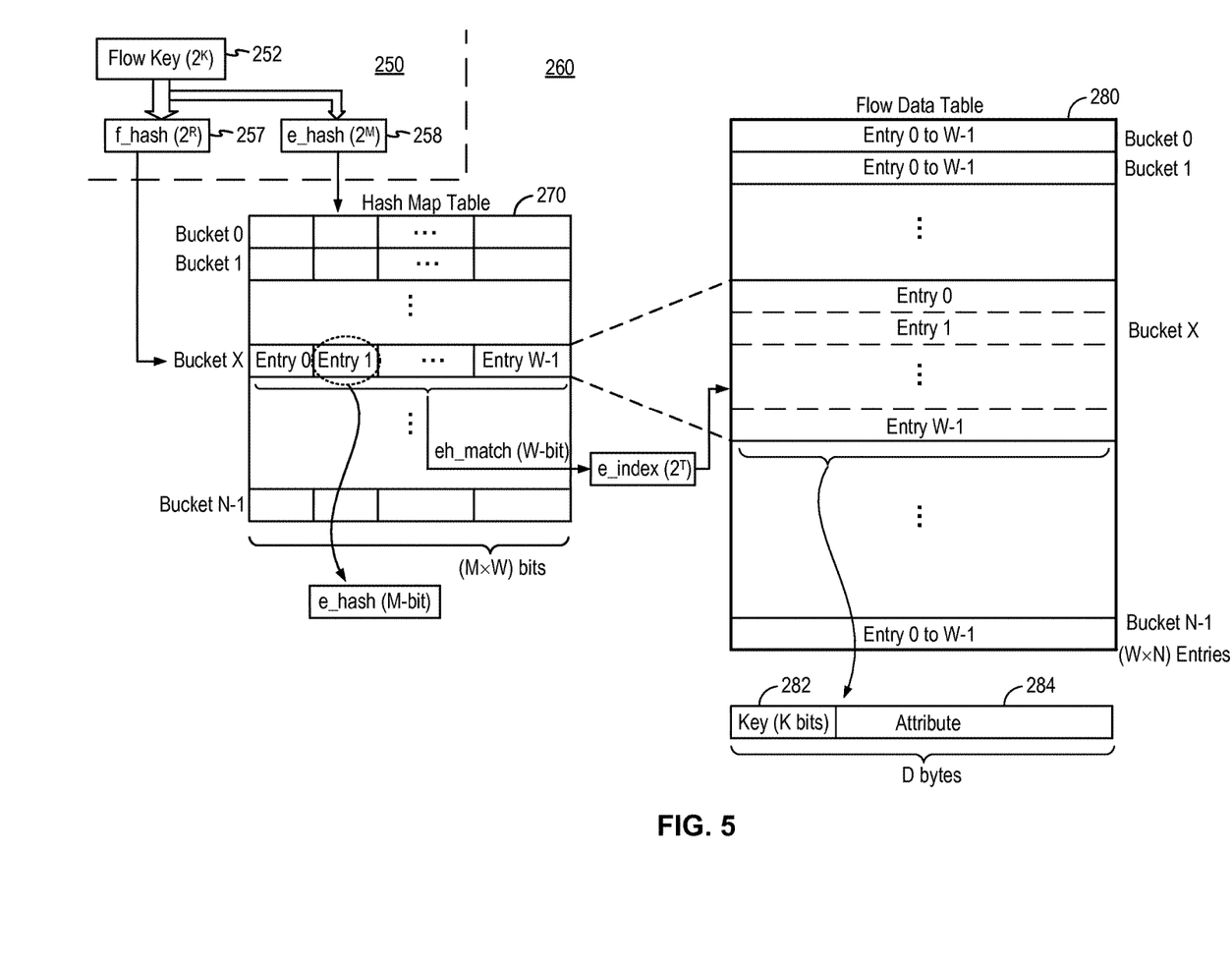
FIG. 5 illustrates the detail configuration of the hash map table and the flow data table forming the flow table of the security device in embodiments of the present invention.

FIG. 5 illustrates the detail configuration of the hash map table and the flow data table forming the flow table of the security device in embodiments of the present invention. Referring to FIG. 5, the hash map table 270 includes N buckets where each bucket includes W entries, where $W \leq 2^T$ and N can be any integer equal to or greater than 1. Each entry in the hash map table 270 stores an M-bit entry hash e_hash value so that an entire bucket in the hash map table 270 has a width of M×W bits. The flow hash f_hash 257 from the flow engine 250 is used to index the hash map table 270 to identify the corresponding bucket, for example, Bucket X. The entry hash e_hash 258 from the flow engine 250 is used to locate one or more entries within the indexed bucket to identify entries with matching entry hash values in that bucket.

In embodiments of the present invention, the flow lookup method retrieves the entire bucket of entry hash values at the bucket indexed by the flow hash for comparison. For example, entry 0 to entry W−1 in bucket X are retrieved. The flow lookup method performs a comparison of the entry hash value 258 from the flow engine with the W stored entry hash values to find a match. The comparison is typically performed by the flow engine. In one embodiment, the comparison of the W stored entry hash values is performed in parallel. An entry hash match code in W bits is generated with a bit set for each stored entry matching the entry hash value 258. The entry hash match code is decoded to generate the corresponding entry index values (0 to W) in T bits as the entry index e_index output. The entry index e_index (T-bit) is used to represent the offset location of an entry in the bucket. When multiple matches are found and multiple entry index values are generated, each entry index value is used in turn to index the flow data table 280.

The flow data table 280 includes N buckets where each bucket includes W entries. Each entry in the flow data table 280 stores the flow key 282 in K bits and the associated flow attribute 284. Each flow record may have a width of D bytes, much larger than the width of the hash map table. The flow data table 280 is indexed by the flow hash f_to identify a bucket (e.g. Bucket X) and is further indexed by the entry index e_index to identify an entry within the indexed bucket in which the desired flow record may reside. Once a flow record is identified, the flow key is retrieved to be compared with the original flow key 252 to verify that the correct flow record has been identified.

As thus configured, the hash map table 270 has a total memory size of W×M×N bits, where M may be 8 or 16. Meanwhile, the flow data table 280 has a total memory size of W×(8*D)×N bits, where 8*D is 512 bits (64 bytes) or 1024 bits (128 bytes). Thus, the flow data table 280 can be 32 to 64 times larger than the hash map table 270.

Figure 6:
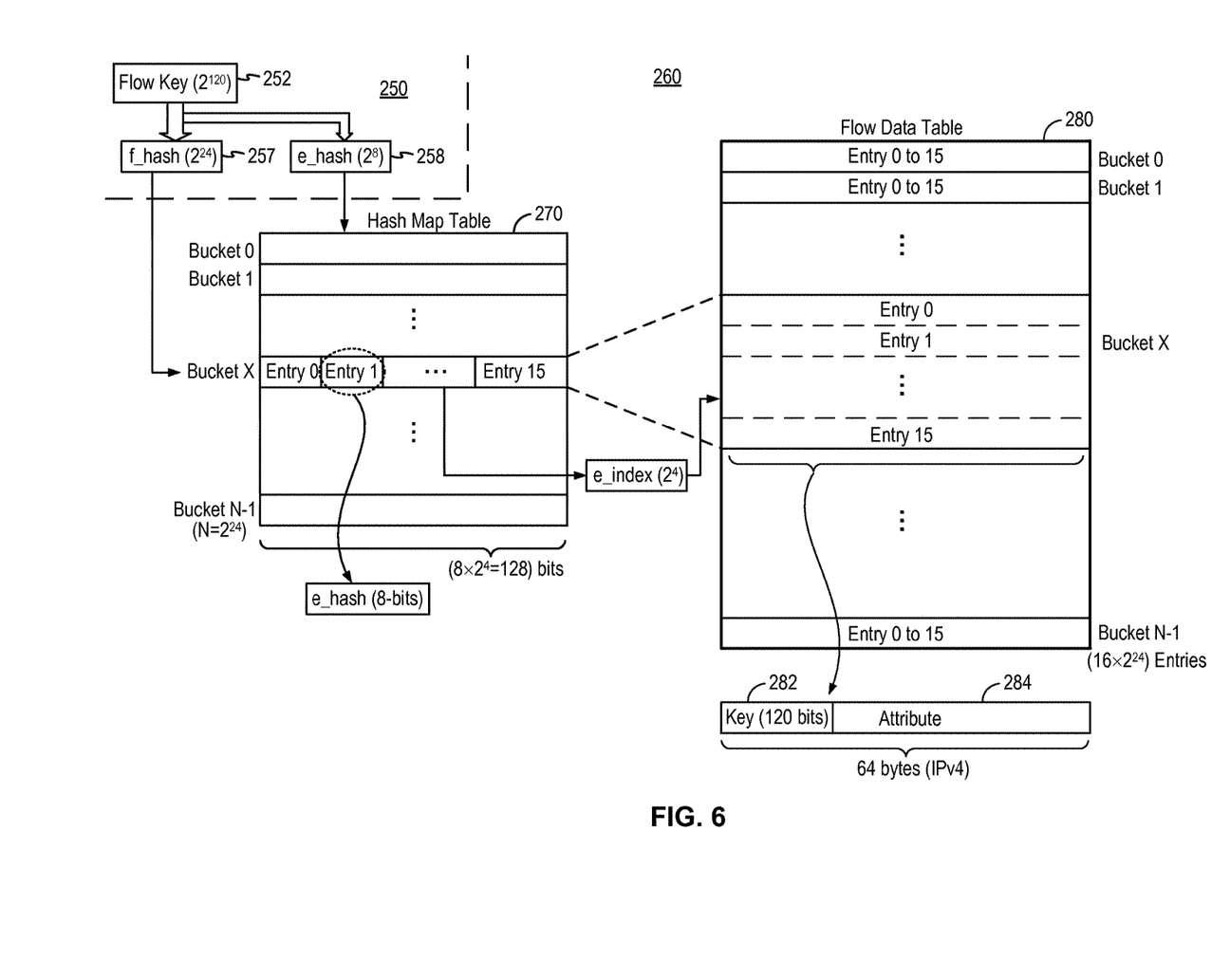
FIGS. 6 and 7 illustrate example configurations of the hash map table and the flow data table in embodiments of the present invention.
Figure 7:
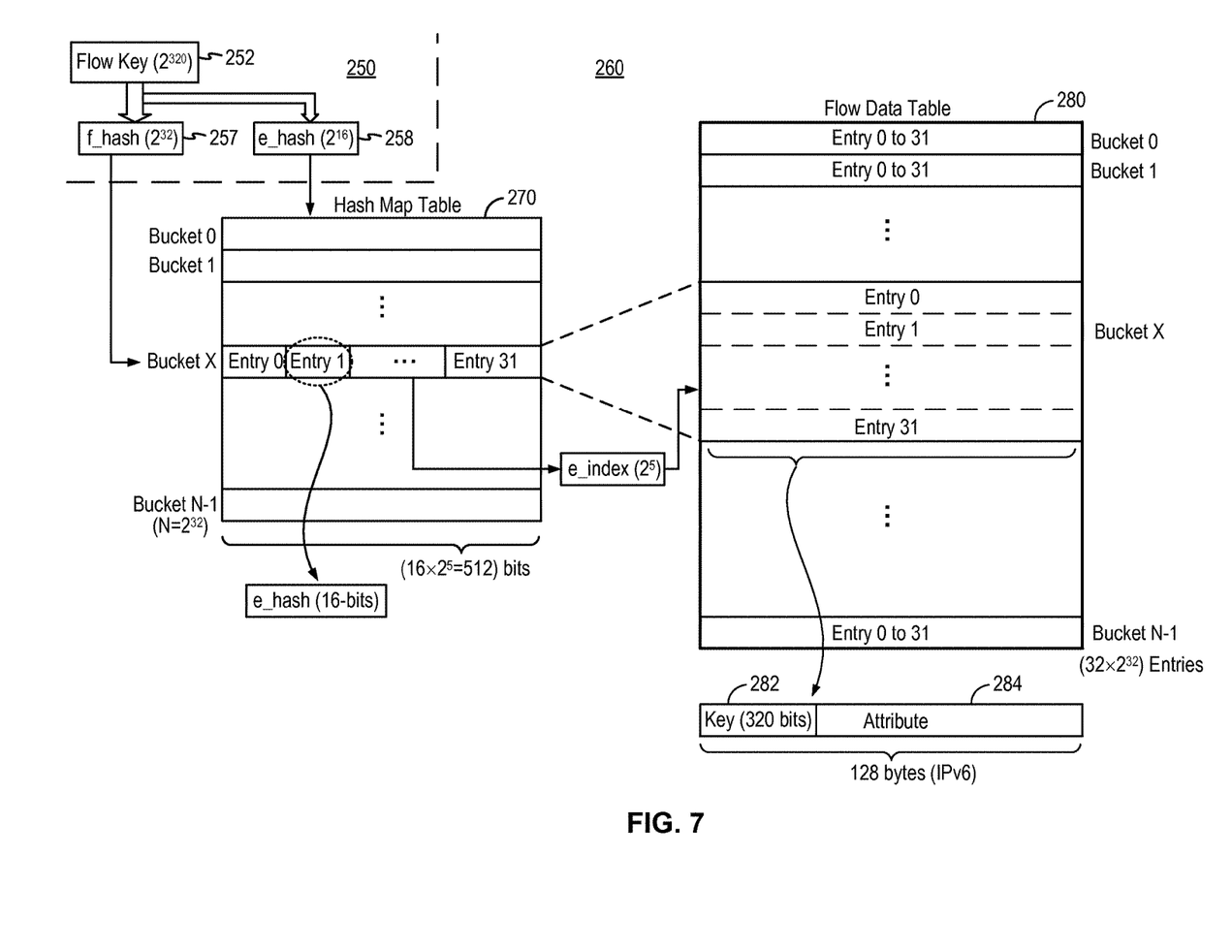

FIGS. 6 and 7 illustrate example configurations of the hash map table and the flow data table in embodiments of the present invention. Referring first to FIG. 6, in one example, the hash map table and the flow data table are implemented with up to 16 million ($2^{24}$) buckets, each bucket having 16 bucket entries. The flow hash is a 24-bit value while the entry hash is an 8-bit value. The entry index has 4 bits to uniquely identify the 16 entries. When the flow table is configured for the IPv4 Internet Protocol, each flow record in the flow data table may be 64 bytes wide with a flow key of 120 bits. Referring next to FIG. 7, in another example, the hash map table and the flow data table are implemented with up to 4 billion ($2^{32}$) buckets, each bucket having 32 bucket entries. The flow hash is a 32-bit value while the entry hash may be a 12-bit to 16-bit value. The entry index has 5 bits to uniquely identify the 32 entries. When the flow table is configured for the IPv6 Internet Protocol, each flow record in the flow data table may be 128 bytes wide with a flow key of 320 bits.

In embodiments of the present invention, the hash map table is implemented using a discrete memory, such as a DRAM while the flow data table is implemented using a DIMM (dual in-line memory module). In other embodiments, the hash map table can also be implemented using a DIMM. In one embodiment, the hash map table is a 512 Mbytes memory while flow data table is 32 Gbytes.

Figure 8:
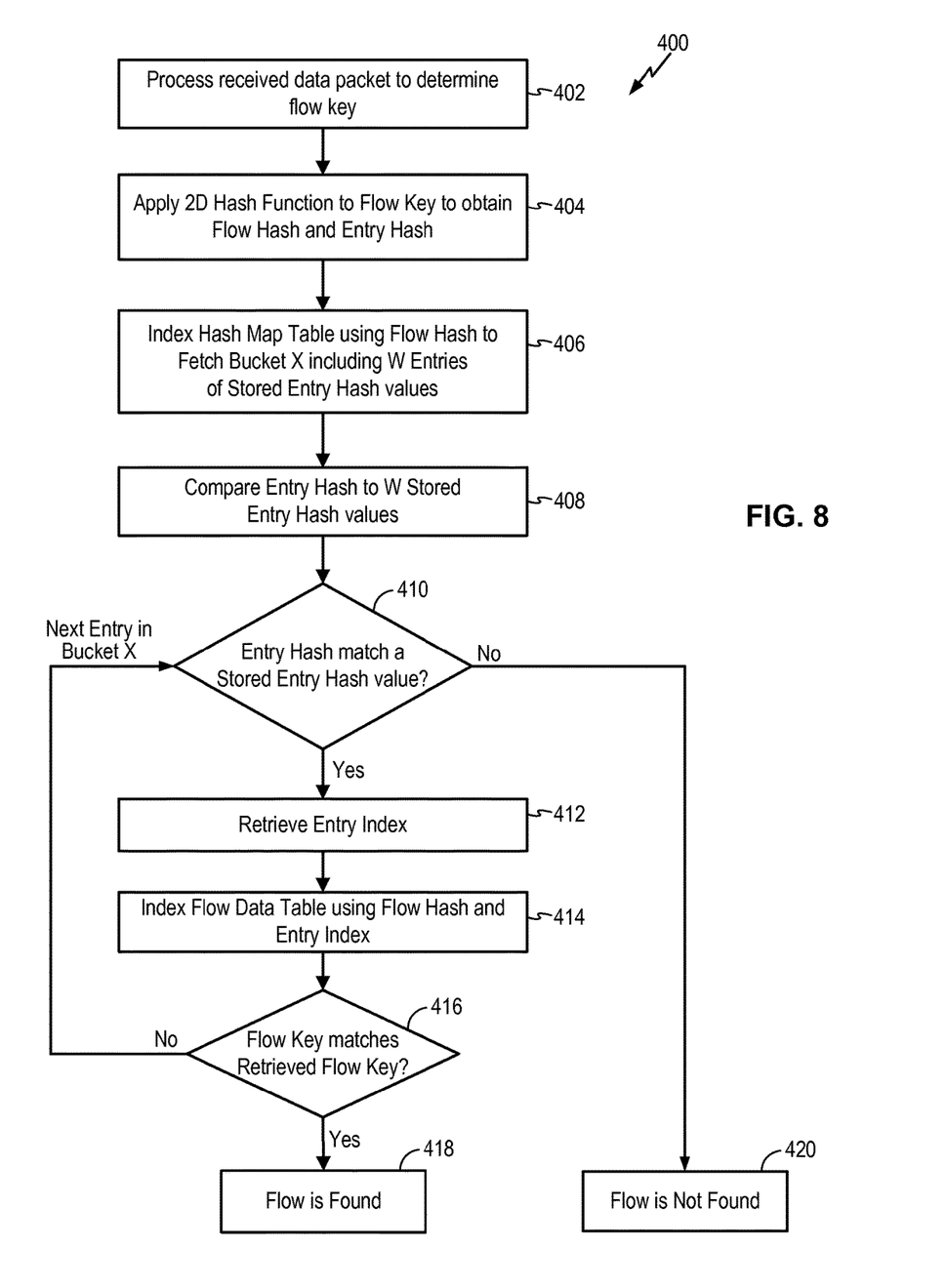
FIG. 8 is a flow chart illustrating the flow lookup method in embodiments of the present invention.

FIG. 8 is a flow chart illustrating the flow lookup method in embodiments of the present invention. Referring to FIG. 8, a flow lookup method 400 starts at 402 where a received data packet is processed to determine the flow key. At 404, a 2D hash function is applied to the flow key to obtain a flow hash value and an entry hash value. The flow hash value and the entry hash value are orthogonal to each other. At 406, the flow hash is used to index the hash map table to retrieve a bucket X including W entries of stored entry hash values. At 408, the entry hash generated from the received data packet is compared to each of the W stored entry hash values retrieved from bucket X. In one embodiment, the comparison is performed in parallel.

At 410, the flow lookup method 400 determines if a match is found. If the entry hash matches one of the stored entry hash values, the entry index for that matching entry is retrieved (412). At 414, the flow data table is indexed using the flow hash to identify the bucket and using the entry index to identify the location of the entry within the bucket. At 416, the flow lookup method 400 matches the retrieved flow key in the indexed flow record to the flow key of the received data packet. If a match is found, then the flow lookup method 400 returns a result that a flow is found (418). If a match is not found, the flow look-up method 400 returns to 410 to obtain the next entry index with a matching entry hash value. If another matching entry hash value is present, method 400 repeats 410 to 416 to determine if this entry index in the flow data table leads to a matching flow key (418). When all the entry hash index with matching entry hash values have been used or no other matching entry is found (410), the flow lookup method 400 returns a result that the flow is not found in the flow table (420). The comparison of the entry hash values and the flow key is typically performed by the flow engine.

The flow lookup method of the present invention realizes many advantages. First, the flow lookup method ensures fast lookup operation as only two table lookup operation is required and because the hash map table is small, the lookup of the hash map table can be very fast. Second, hash values collisions are mitigated by the use of 2D orthogonal hash values. In operation, multiple entry hash collision is extremely rare and the collision rate can be controlled by selecting the appropriate number of bits M for the entry hash values.

In embodiments of the present invention, the flow engine may perform flow insertion by using the hash map table, without the need to walk through entries in the buckets in the flow data table to find an empty entry. In one embodiment, an empty entry in a bucket has stored therein a predetermined empty indicator value, such as all 1's, as the entry hash value. Then, when the flow engine needs to add a flow record, the flow engine fetches the hash map table for a bucket and determine if any entry is empty by reading the empty indicator. When an empty entry is found, the flow engine writes in a new entry hash value and write the flow record (flow key and flow attribute) in the flow data table. The flow insertion process is completed. When the buckets are all full, the flow engine may use the overflow area. In other embodiments, the flow engine may assign one bit of the entry hash value as a valid bit to indicate whether that entry is a valid entry.

In embodiments of the present invention, modulation is applied after the 2D hash function to generate a slightly smaller flow hash and entry hash values to maintain hash entropy and facilitate overflow handling. In some embodiments, modulation of e_hash value also is necessary to avoid conflict with the predetermined empty indicator, such as all 1's. In one embodiment, prime modulation is used. In another embodiment, the prime modulation uses the value 251. In some cases, modulation is not necessary when a valid bit is used in the entry hash value to signify a valid entry.

In the embodiment shown in FIG. 4, overflow areas are allocated in the hash map table and the flow data table to store overflow data. The use of allocated memory space for overflow storage is illustrative only. In other embodiments, a separate discrete memory, such as an SRAM or a CAM, may be used to handle flow overflow conditions.

In the above-described embodiments, the flow lookup method is implemented in a security device for performing flow lookup operation for security policy enforcement. In other embodiments of the present invention, the flow lookup method may be applied to other devices or systems, such as a networking device, to facilitate memory lookup operations. For instance, a networking device may implement the flow lookup method of the present invention to identify and classify flows for policy control or for rate control. The flow lookup method has particular applications in video streaming when a network device needs to determine the desired data rate to use for that particular connection.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A security device performing flow classification and storing flow information in a flow table, the security device comprising:
   a flow engine configured to receive incoming data packets and to generate a flow key identifying a flow to which the received data packet belongs, the flow engine further configured to apply a hash function to the flow key to generate a flow hash value and an entry hash value, the hash function comprising first and second orthogonal hash functions, wherein the flow engine is configured to apply the first and second orthogonal hash functions to the flow key to generate the flow hash value from the first orthogonal hash functions and to generate the entry hash value from the second orthogonal hash function, the flow hash value and the entry hash value being independent and orthogonal to each other;

a hash map table including N buckets where each bucket includes W entries, each entry storing a stored entry hash value, the hash map table being indexed by the flow hash value and an entry index value is derived from the entry hash value; and a flow data table including N buckets where each bucket includes W entries, each entry storing a flow record associated with a flow of the incoming data packets, each flow record including a flow key with an associated flow attribute, the flow data table being indexed by the flow hash value and the entry index value to return at least a retrieved flow key from the flow record in the indexed entry, wherein the flow hash value is used to index a specific bucket in the hash map table and the flow data table, the entry hash value is used to derive an entry index value in the indexed bucket in the hash map table, and the entry index value is used to index a specific entry in the indexed bucket of the flow data table in which a flow record associated with the received data packet is stored.

2. The security device of claim 1, wherein the flow engine compares the retrieved flow key from the identified flow record to the flow key generated for the received data packet, the flow engine returning a flow key found result in response to the retrieved flow key matching the flow key of the received data packet.

3. The security device of claim 2, wherein in response to the flow key being found, the flow data table returns the flow attribute in the identified flow record.

4. The security device of claim 1, wherein the hash map table is indexed by the flow hash value to retrieve W entries of stored entry hash values, the flow engine compares the W entries of stored entry hash values to the entry hash value generated for the received data packet, the flow engine generating one or more entry index values indicating one or more entry locations in which a stored entry hash value matches the entry hash value generated for the received data packet.

5. The security device of claim 4, wherein the flow engine generates an entry hash match code having W bits where a bit has a first value to indicate an entry location in which a stored entry hash value matches the entry hash value generated for the received data packet and the flow engine further generates an entry index value indicating an entry location for each bit in the entry hash match code having the first value.

6. The security device of claim 4, wherein the entry index value comprises a T-bit value and the bucket includes W entries, where W is less than or equal to $2^T$.

7. The security device of claim 4, wherein flow engine compares the W entries of stored entry hash values to the generated entry hash value in parallel.

8. The security device of claim 1, wherein the flow engine generates the flow key from one or more of: the header information of the received data packet, the environmental configuration information, and the receiving port of the received data packet.

9. The security device of claim 1, wherein the flow engine is further configured to apply modulation to the flow hash values and the entry hash values.

10. The security device of claim 1, wherein the hash map table is implemented in a DRAM memory device and the flow data table is implemented in a dual in-line memory module.

11. A method in a security device performing flow classification and storing flow information in a flow table, the method comprising:

processing a received data packet to generate a flow key identifying a flow to which the received data packet belongs;

applying a hash function to the flow key to generate a flow hash value and an entry hash value, the hash function comprising first and second orthogonal hash functions, the first orthogonal hash function being applied to the flow key to generate the flow hash value and the second orthogonal hash function being applied to the flow key to generate the entry hash value, the flow hash value and the entry hash value being independent and orthogonal to each other;

accessing a hash map table and including N buckets where each bucket includes W entries of stored entry hash values;

accessing a flow data table and including N buckets where each bucket includes W entries of flow records associated with flows of incoming data packets, each flow record including a flow key with an associated flow attribute;

indexing the hash map table using the flow hash value and deriving an entry index value using the entry hash value; and indexing the flow data table using the flow hash value and the entry index value to return at least a retrieved flow key from a flow record in the indexed entry.

12. The method of claim 11, further comprising:

comparing the retrieved flow key to the flow key generated for the received data packet; and in response to the retrieved flow key matching the flow key generated for the received data packet, generating a flow key found result.

13. The method of claim 12, further comprising:

in response to a flow key found result being generated, providing the flow attribute in the identified flow record in the flow data table.

14. The method of claim 11, wherein indexing the hash map table using the flow hash value and deriving an entry index value using the entry hash value comprises:

indexing the hash map table using the flow hash value to identify a specific bucket in the hash map table;

retrieving W entries of stored entry hash values from the hash map table;

comparing the W stored entry hash value to the entry hash value generated for the received data packet; and generating one or more entry index values indicating one or more entry locations in which a stored entry hash value matches the entry hash value generated for the received data packet.

15. The method of claim 14, wherein generating one or more entry index values indicating one or more entry locations in which a stored entry hash value matches the entry hash value generated for the received data packet comprises:

generating an entry hash match code having W bits where a bit has a first value to indicate an entry location in which a stored entry hash value matches the entry hash value generated for the received data packet; and generating an entry index value indicating an entry location for each bit in the entry hash match code having the first value.

16. The method of claim 14, wherein comparing the W stored entry hash value to the entry hash value generated for the received data packet comprises:

comparing the W stored entry hash value to the entry hash value generated for the received data packet in parallel.

17. The method of claim 14, wherein the entry index value comprises a T-bit value and the bucket includes W entries, where W is less than or equal to $2^T$.

18. The method of claim 11, wherein indexing a flow data table using the flow hash value and the entry index value to return at least a retrieved flow key from an identified flow record comprises:

indexing the flow data table using the flow hash value to identify a specific bucket in the flow data table; and indexing the flow data table using the entry index value to identify a specific entry in the indexed bucket in the flow data table, the flow key being retrieved from the flow record stored in the entry identified by the entry index.

19. The method of claim 11, wherein processing a received data packet to generate a flow key identifying a flow to which the received data packet belongs comprises:

generating the flow key from one or more of: the header information of the received data packet, the environmental configuration information, and the receiving port of the received data packet.

20. The method of claim 11, further comprising:

applying modulation to the flow hash values and the entry hash values.

21. The method of claim 11, further comprising:

implementing the hash map table in a DRAM memory device; and implementing the flow data table in a dual in-line memory module.

\* \* \* \* \*